March 14, 1967
G. R. SMITH
3,309,221
SURFACE ACTIVATION OF PASSIVE POLYMERS
AND ARTICLES PRODUCED THEREBY
Filed March 25, 1963
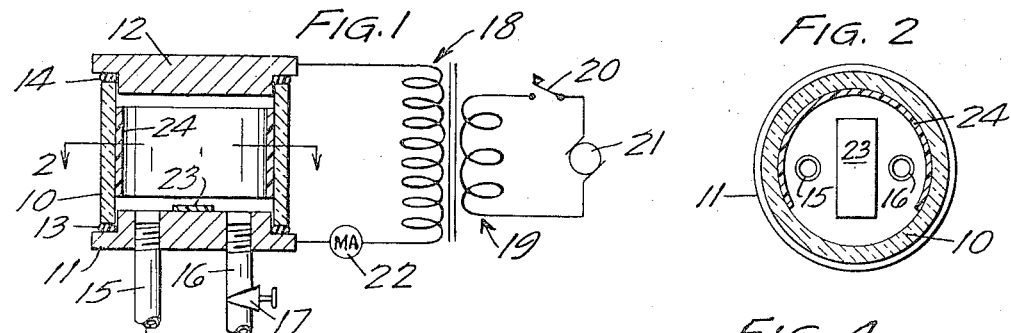
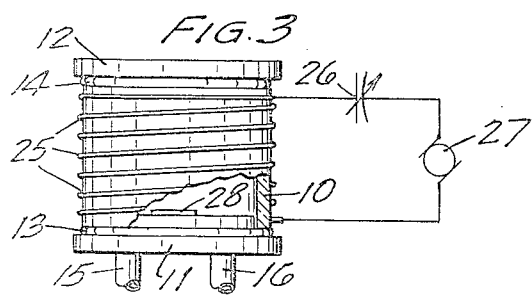
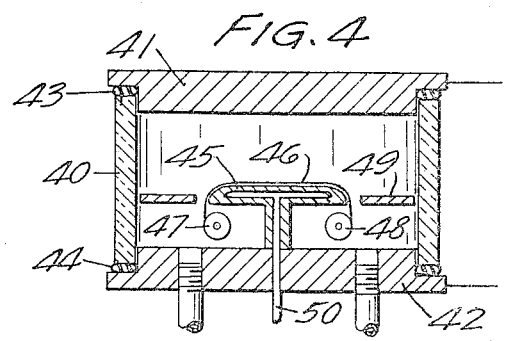
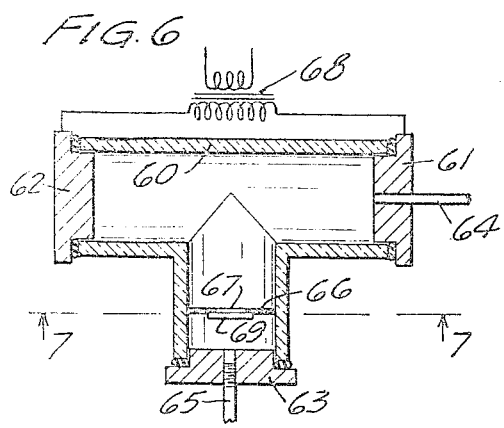
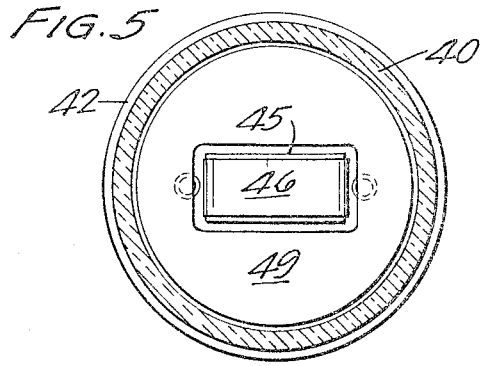
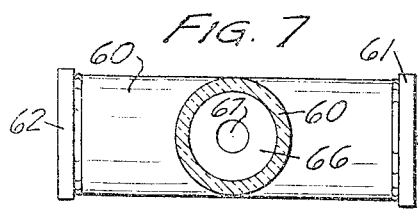
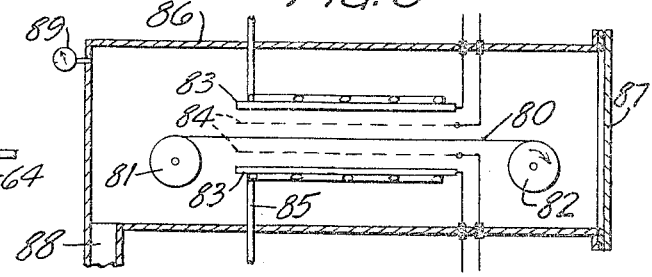
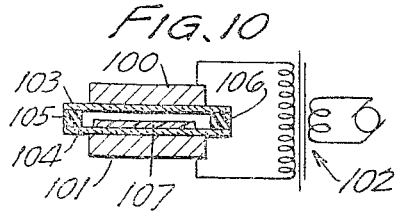
INVENTOR
GORDON R. SMITH
BY
Carpenter, Abbott, Coulter & Kinney
ATTORNEYS

3,309,221
SURFACE ACTIVATION OF PASSIVE POLYMERS AND ARTICLES PRODUCED THEREBY
Gordon R. Smith, Stillwater, Minn., assignor to Minnesota Mining and Manufacturing Company, St. Paul, Minn., a corporation of Delaware
Filed Mar. 25, 1963, Ser. No. 268,856
6 Claims. (Cl. 117—47)

This is a continuation-in-part of my copending application, Ser. No. 661,918, filed May 27, 1957, now abandoned.

This invention relates to the surface activation of fluorine-containing polymer masses having an initially passive exposed fluorocarbon surface, and to articles produced thereby.

While not restricted thereto, the invention has particular utility in providing transparent perfluorocarbon films which retain the desirable physical properties of the parent film while at the same time being easily wet by, and receptive of, adhesive coatings. The invention makes possible the preparation of transparent pressure-sensitive adhesive tapes having a thin polytetrafluoroethylene film backing and capable of being unwound from roll form without delamination. The invention also provides for the bonding of thermosetting resin compositions to polytetrafluorcethylene films and coatings. Other applications and advantages will appear hereinafter.

Films and other articles of polytetrafluoroethylene normally possess passive surfaces which are both oleophobic and hydrophobic, and to which organic adhesives do not strongly adhere. Methods of activating these normally passive surfaces have been developed in which the surface is at least partially defluorinated by controlled reaction with suitable reactants. For example, brief contact with metallic sodium applied in solution in liquid ammonia, followed by washing with water, has been shown to provide on the surface of thin transparent polytetrafluoroethylene film a dark-colored opaque layer to which organic adhesives readily adhere but which greatly reduces the surface resistivity of the film.

Both transparency and high surface resistivity are preserved by employing the activating procedures of the present invention. No subsequent washing or other treatment is required.

Although the exact nature of the resulting active surface, and the specific action occurring at the initially passive fluorocarbon surface, are not now fully understood, the process employed involves in each instance the subjection of the initially passive fluorocarbon surface to the activating action of a low-pressure electrical discharge capable of producing ultraviolet irradiation of very short wavelength, and in the presence of no more than trace amounts of oxygen such as are found in vacuum chambers at pressures less than about 20 mm. Hg.

The low-pressure discharge I have found to activate fluorocarbon surfaces for reception of adhesives and other overcoatings is a vacuum induced low-pressure electrical "glow discharge" which occurs at a current density range of $10^{-3}$ and $10^{-1}$ amperes per square centimeter and with pressure distance (PD) values between electrodes of about 2 to 20 mm. Hg cm.; see Meeks, J. M. and Craggs, J. O., Electrical Breakdown of Gases, first ed., pages 446–448; Oxford University Press, London, 1953.

This vacuum tube glow discharge is a generally non-sparking discharge, and usually assumes a visible blue glow, emitting ultraviolet (UV) light in very short wavelengths of 1800 A. and shorter, which are normally absorbed by air present in normal atmospheric quantities. To be effective as a treating agent, the low pressure chamber in which the article is to be subjected to the short wavelength UV irradiation of the low-pressure glow discharge should contain air, or oxygen. Since the pressure is from about 0.5 mm. Hg to only about 1 mm. Hg, oxygen will thus be present in extremely small quantities which will not absorb significant quantities of short wavelength UV light of 1800 A. and shorter and prevent impingement thereof on the polymer surface. It has been found that at least trace amounts of oxygen should be present for best results.

Electrical discharge of this type has previously been used to remove residual vapors and the like from glass, metal and other surfaces in preparing components of evacuated systems for high vacuum experimentation. In such cases, the thus cleaned surface must be carefully preserved from subsequent contact with air, water vapor or the like. In the present system, the treated polytetrafluoroethylene remains surface-activated during prolonged exposure to the air as well as on washing with various aqueous solutions and organic solvents. Hence there is involved something other than a mere cleaning of the polytetrafluoroethylene surface.

Irradiation and other treatment of various plastic films to provide improved surface wetting with adhesives, inks, and other coatings has also been practiced. Thus, polyethylene films have been flame treated, or exposed to electrical discharges, or treated with ozone, as a means of improving their respectivity for printing inks and the like. The action has been said to involve dehydrogenation of the polymer, the formation of double bonds, and partial oxidation. The passive fluorocarbon surfaces here to be treated need contain no hydrogen, and the fluorine-carbon bond is not ordinarily considered as being susceptible of oxidation; hence the type of treatment applicable to polyethylene would be expected to have no effect whatever on, for example, polytetrafluoroethylene. While such polymers may include hydrogen-containing catalyst fragments, the amount is so small that they may properly be designated as "hydrogen-free."

It has now been found that polytetrafluoroethylene, and analogous materials such as copolymers of tetrafluoroethylene and hexafluoropropylene, having normally passive and non-reactive fluorocarbon surfaces, may be rendered perseveringly receptive of liquids and adhesive materials by subjecting the surfaces thereof to low-pressure glow discharge, and which will now be further described in illustrative examples and in connection with the accompanying drawings.

In the drawings:
FIGURE 1 indicates in cross-section a discharge chamber as applied to the treatment of polytetrafluoroethylene and similar films, in conjunction with suitable power supply, the latter being indicated schematically;
FIGURE 2 is a sectional plan view of the discharge chamber of FIGURE 1 taken along the line 2—2;
FIGURE 3 is a view in elevation of another form of apparatus, partly cut away to show interior detail, and including schematic representation of power supply;
FIGURE 4 represents a continuous treatment type apparatus in cross-section;
FIGURE 5 is a plan view of the apparatus of FIGURE 4 with the upper electrode assembly removed;
FIGURE 6 represents a further form of treatment chamber, shown in longitudinal cross-section;
FIGURE 7 is a view of the apparatus of FIGURE 6 sectioned at line 7—7;
FIGURE 8 schematically represents in cross-section a commercial form of continuous treating apparatus employing low pressure electrical discharge.

The apparatus of FIGURES 1 and 2 includes a section 10 of heavy glass tubing, in this case having a length of about 3½ inches and an internal diameter of 4 inches, fitted with metal bottom and top elements 11 and 12 forming a tight seal against the ends of the glass tube through ring gaskets 13 and 14. The member 11 is fitted with an outlet 15 connected to a suitable vacuum pump, and an inlet 16 fitted with a needle valve 17 for permitting re-entry of air to the evacuated chamber.

The bottom and top members serve as electrodes, and are connected to the secondary winding 18 of a suitable transformer, the primary winding 19 being connected to a power source 21 through a switch 20. A millammeter 22 is included in the high voltage circuit. Specimens to be treated may be placed either on the bottom electrode as indicated at 23, or around the walls of the vessel as indicated at 24. Depending on the positioning of the electrodes, PD values of 0.25 to 18.3 mm. Hg centimeters resulted. Current densities with this set up, as well as the further modification of FIGURES 3–8, varied from $0.75 \times 10^{-3}$ to $3.0 \times 10^{-1}$ amps per cm.$^2$.

A strip of fused extruded polytetrafluoroethylene film 23 having a thickness of 4 mils was placed in the position indicated and the vessel evacuated to a pressure of one-half mm. Hg. Alternating current was supplied to the transformer at a voltage of up to about 600 volts, which dropped to about 500 volts during discharge and was just sufficient to cause a visible glow within the vessel, the current flowing in the system providing a measurement on the meter 22 of about 30 milliamperes. After exposure to these conditions for 60 seconds the circuit was broken, air was admitted to the chamber, and the specimen was removed and tested.

The strip was applied to the adhesive surface of a section of pressure-sensitive adhesive tape and removed therefrom by stripping while measuring the removal effort required. When this test was applied to an untreated polytetrafluoroethylene film the force required was about 5 ounces for a width of one-half inch. The treated strip provided a removal effort under the same conditions of 37 ounces.

Fully equivalent results have been obtained by substituting continuous or pulsating direct current for alternating current in establishing the activating electrical discharge.

The surface resistivity of the treated film, while appearing to be somewhat lower than that of the untreated film, was greater than could be effectively measured by the usual methods employed in measuring high resistances, and was much greater than the surface resistivity of a polytetrafluoroethylene film which had been surface treated with metallic sodium in liquid ammonia and then carefully washed.

In another experiment the strip of polytetrafluoroethylene film, in this case having a thickness of 10 mils, was placed within the apparatus in the position indicated by the sample 24 in FIGURES 1 and 2. The vessel was evacuated, and voltage applied as before, in this instance for periods of 15 minutes and at a current of 200 milliamperes, providing a visible glow in each case. The pressure in the vessel was held at 75 microns, 250 microns, 500 microns, and 750 microns in a series of runs. The resulting treated film was in each instance coated with a thin layer of a heat-curing silicone pressure-sensitive adhesive composition which was subsequently cured by heating. Strips of the coated material were then tested to determine the force necessary to separate the adhesive coating from the adhesive film surface. Under the conditions employed, a control sample of untreated film required a force of 30 ounces per one-half inch width for adhesive removal, whereas the forces required for each of the four test specimens were 48, 52, 48, and 40 ounces per one-half inch, respectively.

Similar treatment and test was applied to a series of pigmented thin polytetrafluoroethylene films. The two mil films were treated under a vacuum of 200 microns at a current input of 200 milliamperes for 16 seconds each, were coated with the heat-curing silicone pressure-sensitive adhesive composition which was then cured, and were tested for offsetting or removal of the adhesive layer. In this test, the one-half inch adhesive-coated film was adhered to a flat steel or other test panel and removed by stripping back over itself at constant speed. With the untreated films the film was found to come away from the adhesive coating at a force of between 12 and 20 ounces, whereas the adhesive coating applied to the treated film was not released at forces up to 34–46 ounces, the force at which the coated film pulled away from the test surface. The treated film was not visibly distinguishable from the untreated.

Similar effects were obtained by treating polytetrafluoroethylene film in the apparatus of FIGURE 3. In this modification a copper conductor 25 is spirally wound around the glass tube 10 of the apparatus of FIGURE 1. Specifically, a helical winding of 25 turns of No. 20 copper wire was used. The ends of the winding were connected to a variable transformer 26 and a source 27 of alternating potential, the constants of the circuit being selected to provide resonance at about 900 kc., thereby providing a visible glow within the evacuated chamber. A sample of polytetrafluoroethylene film 28 placed against the bottom member 11 as indicated in FIGURE 3, and exposed for 60 seconds to the discharge obtained under a vacuum of one-half mm. Hg, was tested on both exposed and protected surfaces by first applying a strip of pressure-sensitive adhesive tape and then measuring the force required to peel the tape from the surface. A force of 6 ounces removed the tape from the bottom or unexposed surface of the film, whereas a force of 21 ounces was required to remove the tape from the exposed top surface.

FIGURES 4 and 5 illustrate a semi-automatic treating chamber in which a glass tube 40, in this instance having an internal diameter of 8⅜ inches, and closed at the ends by members 41 and 42 through gaskets 43 and 44, contains a pedestal platen 45 over which a strip of polytetrafluoroethylene or similar film 46 is drawn from supply reel 47 to windup reel 48. The film-carrying unit is surrounded by an open-centered metal plate 49. Both the plate 49 and the platen 45 are connected to the lower closure member 42 and serve as a lower electrode, the upper closure member 41 serving as the opposing electrode. The platen 45 is provided with internal cooling means indicated by tube 50, and the windup reel 48 is mechanically driven, by means not shown, so as to draw the film 46 over the platen 45 and through the activating zone at any desired speed.

A substantial yardage of 2 mil transparent polytetrafluoroethylene film several inches in width was activated in the apparatus just described at speeds providing exposures of 15–60 seconds under a vacuum of one-half mm. Hg and at a current input of 200 milliamperes which was sufficient to provide a visible glow within the evacuated chamber. The treated film was coated with heat-curing silicone pressure-sensitive adhesive composition which was then cured, and the product was slit into desired widths and wound up in roll form to provide rolls of transparent pressure-sensitive adhesive tape. The tape could be unwound from roll form, and applied to various surfaces under light finger pressure, and then removed therefrom, without splitting or offsetting of the adhesive layer. When a strip of this tape one-half inch in width was applied with its adhesive coating against a strongly adherent test surface and then pulled back lengthwise over itself, the film separated from the cured silicone adhesive at a force of about 70–75 ounces. With untreated polytetrafluoroethylene film tested in the same way, a force of only 5 ounces was needed. Such pressure-sensitive adhesive tape products, made with the untreated film, cannot successfully be unwound from roll form or removed from surfaces to which applied without offsetting of adhesive.

Activation of polytetrafluoroethylene film was successfully accomplished in the apparatus just described at speeds up to 12 yards/min., giving an exposure to the activating discharge of about 2 seconds.

The apparatus of FIGURES 6 and 7 consists of a heavy walled glass tube 60 in the form of a T, provided with gasketed end members 61, 62, and 63, vacuum connections 64 and 65, and an interior metal disc 66 having a central circular fluorite disc window 67. The end members 61 and 62 are connected to a source of high voltage alternating potential here indicated as transformed 68.

A sample 69 of polytetrafluoroethylene film was placed over the fluorite window 67 as indicated in the drawing, and the system was evacuated on both sides of the disc 66 to a pressure of one-half mm. Hg. A potential was applied across electrodes 61 and 62 for two minutes and at a value sufficient to provide within the tube a visible glow. The film sample was removed and was found to be hydrophilic over the area which had been in contact with the fluorite window while remaining hydrophobic on all other surface areas. Subsequent exposures in the same apparatus provided effective activation of polytetrafluoroethylene or similar normally passive surfaces only when the fluorite window was first carefully cleaned by mild abrasive action so that no significant air barrier was between the film and the window, which absorbs the 1800 A. and shorter UV.

The hydrophilic nature of the film surface treated as just described is an effective indication that the treated surface is active toward organic adhesives.

Much larger sections of polytetrafluoroethylene film and the like have been treated in an apparatus such as indicated in FIGURE 8, in which the film 80 is drawn from supply reel 81 to windup reel 82 between two oppsing electrode systems each consisting of a plate electrode 83 and a grid electrode 84. The plate electrodes are preferably provided with cooling means, here indicated as tube system 85. The entire assembly is contained within a tank 86 having a detachable cover 87 and connected to vacuum through an outlet 88, the interior pressure being measured on vacuum gauge 89. The various electrodes are connected to external electrical supply systems through insulated leads as indicated in the drawing.

Auxiliary equipment is provided for driving the windup reel 82, maintaining tension on the stock reel 81, holding the two reels in proper alignment, determining the condition of the activating discharge, and the like. For example, inspection ports enable the operator to maintain a sustained visible glow between the operating plate and grid electrodes without sparking, as the film is drawn at a uniform rate past the electrode area.

It will be seen that the film 80 may be subjected to an activating discharge through a grid electrode and at either or both surfaces as it is drawn past the electrode systems within the evacuated chamber.

Polytetrafluoroethylene film was treated in the apparatus just described under a variety of conditions as to vacuum, time of irradiating, intensity of irradiation, etc., comparable to those of the previous examples, and fully equivalent results in terms of surface activation were obtained.

In a still further experiment, powdered polytetrafluoroethylene was exposed to the activating discharge in an apparatus similar to that of FIGURES 1 and 2, with sufficient agitation so that each of the particles was fully exposed to activation. The powdered product was mixed with a heat-curing silicone rubber composition to form a plastic sealant, and the mixture was then heated in excess of 100 hours at 400° F. Throughout this treatment the mass remained soft and pliable, and appeared homogeneous when stretched and manipulated with the fingers. A similar mixture of the same silicone rubber composition with an untreated powdered polytetrafluoroethylene in the same proportions was found to pull apart and disintegrate under hand manipulation after only 20 hours at 400° F., showing that the silicone did not effectively wet the passive surface of the untreated fluorocarbon polymer particles.

The activated surface of polytetrafluoroethylene and similar normally passive fluorocarbon-surfaced polymers is substantially unchanged in appearance from the original passive surface, even though significantly altered in its activity toward both aqueous and non-aqueous liquids and plastic masses. The activation perseveres even after contact with strong reagents and solvents. For example, washing the activated surface of a polytetrafluoroethylene film with solvents such as aliphatic and aromatic hydrocarbons, ketones, etc., or with strong aqueous acids or alkalies, has been found to cause no significant diminution in the ability of such surfaces to be wet by, or to retain, organic adhesive materials applied thereto.

The process is applicable to all types of normally passive fluorocarbon surface materials, including, for example, films of polytetrafluoroethylene or of copolymers of tetrafluoroethylene and hexafluoropropylene formed by skiving from massive sintered cylinders as well as fused extruded films of this material. Useful effects are produced on polytrifluoromonochloroethylene surfaces also. The effect produced is important in the preparation of insulating pressure-sensitive adhesive tape products, as has been shown, and is particularly important in the preparation of high-temperature tapes employing silicone pressure-sensitive adhesives. The effect is useful, however, in connection with other pressure-sensitive adhesives, such for example as pressure-sensitive adhesives based on acrylic acid ester polymers, as well as with non-pressure-sensitive adhesive or cementing compositions. In demonstrating this type of adhesion, thin polytetrafluoroethylene films have been activated and then bonded to thin aluminum panels by means of an intervening thin heat-curing layer of 100 parts of liquid epoxy resin and 10 parts of diethylene triamine curing agent. After curing of the resin, the thin polytetrafluoroethylene film is found to be so firmly bonded thereto that it cannot be stripped from the panel without severe distortion. Effective bonding has also been obtained with heat-cured phenol-aldehyde resins. Under the same set of conditions, an untreated polytetrafluroroethylene film can be easily lifted from the cured resin surface without any distortion whatever.

While other electrical treatments, such as corona discharge, appear to be initially effective to increase receptivity of fluorocarbon surfaces to adhesives, the increase has not been found sufficient to enable rapid unwinding of adhesive coated fluorocarbon film backed tapes from roll form without massive adhesive transfer. Adhesive tapes having glow discharge treated surfaces to which the adhesive is adhered are storage stable in roll form for long periods of time, e.g. two years or more, and still capable of unwind without adhesive transfer.

There has thus been provided a method for the surface activation of highly fluorinated fluorocarbon polymer articles such as polytetrafluoroethylene films having a surface which is normally passive toward organic adhesive materials. The method requires no chemical treatment and produces no visible change in the product and no weakening of the physical qualities of the product. There is produced a new material, namely a fluorocarbon polymer capable of withstanding thermal, physical, chemical and electrical stresses to substantially the same degree as the untreated polymer and in addition capable of retentively accepting organic adhesive materials.

What I claim is as follows:

1. The method of activating a passive hydrogen-free fluorocarbon polymer surface to provide increased receptivity of said surface to adhesion with adhesives and other overcoatings which comprises subjecting said polymer surface to a vacuum induced low-pressure electrical glow discharge generated at a current density range of $10^{-3}$ and $10^{-1}$ amperes per square cm. with pressure-distance values between electrodes of about 2 to 20 mm. Hg cm., said discharge emitting ultraviolet irradiation of wavelengths of about 1800 A. and shorter, said polymer surface being in the path of said irradiation and in an oxygenated atmosphere having insufficient oxygen present to absorb said short wave ultraviolet irradiation before impingement thereof on said polymer surface, said irradiation being for a period of time sufficient to activate said polymer surface.

2. The method of activating a polytetrafluoroethylene film surface to provide increased receptivity of said surface to adhesion with adhesives and other overcoatings which comprises subjecting said polymer surface to a vacuum induced low-pressure electrical glow discharge generated at a current density range of $10^{-3}$ and $10^{-1}$ amperes per square cm. with pressure-distance values between electrodes of about 2 to 20 mm. Hg cm., said discharge emitting ultraviolet irradiation of wavelengths of about 1800 A. and shorter, said polymer surface being in the path of said irradiation and in an oxygenated atmosphere having insufficient oxygen present to absorb said short wave ultraviolet irradiation before impingement thereof on said polymer surface, said irradiation being for a period of time sufficient to activate said polymer surface.

3. A storage stable adhesive tape wound in roll form comprising a hydrogen-free fluorocarbon polymer backing having a coating of heat-curing silicone pressure-sensitive adhesive on an activated surface thereof, said polymer surface having been activated by irradiation with ultraviolet light having wavelengths of about 1800 A. and shorter, said ultraviolet light having been emitted in an oxygenated atmosphere having a pressure of about one mm. of Hg or less by a low-pressure glow discharge having a current density of about $10^{-1}$ to $10^{-3}$ amps per cm.$^2$, and a pressure-distance value between electrodes of about 2 to 20 mm. Hg cm.

4. The article of claim 3 wherein said hydrogen-free fluorocarbon polymer is a perfluorinated polymer.

5. The method of activating a passive hydrogen-free fluorocarbon polymer surface to provide increased receptivity of said surface to adhesion with adhesives comprising subjecting said surface to short wave ultraviolet irradiation in a vacuum chamber at a pressure of about 1 mm. Hg and less by inducing in said chamber a low-pressure electrical glow discharge, said discharge being induced by creating a current density range of $10^{-3}$ to $10^{-1}$ amperes per square cm. between electrodes having a pressure-distance value of about 2 to 20 mm. Hg cm., the irradiation being carried out in the presence of oxygen pressure and for a period of time sufficient to activate said polymer surface.

6. A normally passive hydrogen-free fluorocarbon polymer having at least one surface thereof activated for receptivity to adhesives, said surface having been activated by irradiation with ultraviolet light having wavelengths of about 1800 A. and shorter, said ultraviolet light having been emitted in an oxygenated atmosphere having a pressure of about one mm. of Hg or less by a low-pressure glow discharge having a current density of about $10^{-1}$ to $10^{-3}$ amps per cm.$^2$, and a pressure-distance value between electrodes of about 2 to 20 mm. Hg cm.

References Cited by the Examiner

UNITED STATES PATENTS

| | | |
|---|---|---|
| 2,824,026 | 2/1958 | Homeyer et al. |
| 2,845,541 | 7/1958 | Berry et al. _____ 117—93.31 |
| 2,859,480 | 11/1958 | Berthold et al. |
| 2,864,755 | 12/1958 | Rothacker. |
| 2,881,470 | 4/1959 | Berthold et al. _____ 264—22 |
| 2,882,412 | 4/1959 | Cunningham. |
| 2,940,869 | 6/1960 | Graham _____ 117—93.31 |

OTHER REFERENCES

Meeks and Craggs: Electrical Breakdown of Gases, first edition, Oxford University Press, London (1953), pp. 122–126 relied on.

ALFRED L. LEAVITT, *Primary Examiner.*

A. H. ROSENSTEIN, *Assistant Examiner.*